(12) United States Patent
Medici et al.

(10) Patent No.: US 6,595,553 B2
(45) Date of Patent: Jul. 22, 2003

(54) ACCESSORY COMPONENT FOR PIPING

(75) Inventors: Daniele Medici, Reggio Emilia (IT); Alberto Garuti, Rubiera (IT)

(73) Assignee: ARAG S.r.l. Con Socio Unico, Rubiera (IT)

( * ) Notice: Subject to any disclaimer, the term of this patent is extended or adjusted under 35 U.S.C. 154(b) by 0 days.

(21) Appl. No.: 09/983,832

(22) Filed: Oct. 26, 2001

(65) Prior Publication Data

US 2002/0050717 A1 May 2, 2002

(30) Foreign Application Priority Data

Oct. 30, 2000 (IT) ..................... MO2000A0237

(51) Int. Cl.[7] .................................. F16L 3/00
(52) U.S. Cl. ............... 285/61; 285/24; 248/58; 248/70
(58) Field of Search ............... 285/61, 24, 26, 285/39, 23, 18, 56, 58; 248/58, 62, 59, 70, 71, 74.1

(56) References Cited

U.S. PATENT DOCUMENTS

| | | | | | |
|---|---|---|---|---|---|
| 258,638 | A | * | 5/1882 | Ford ........................ | 248/58 |
| 519,878 | A | * | 5/1894 | Stevens, Jr. ................ | 285/56 |
| 1,061,632 | A | * | 5/1913 | Podolsky .................... | 285/58 |
| 2,488,816 | A | * | 11/1949 | Heaton ...................... | 285/61 |
| 3,014,223 | A | * | 12/1961 | Pope ......................... | 248/70 |
| 3,185,418 | A | * | 5/1965 | Appleton .................. | 248/74.1 |
| 3,310,264 | A | * | 3/1967 | Appleton .................. | 248/74.1 |
| 3,409,918 | A | * | 11/1968 | Gaddy ....................... | 285/58 |
| 3,826,522 | A | * | 7/1974 | Dawes ....................... | 285/18 |
| 4,004,766 | A | * | 1/1977 | Long ........................ | 248/70 X |
| 4,185,334 | A | * | 1/1980 | Izzi .......................... | 285/58 X |
| 4,209,155 | A | * | 6/1980 | Florian ..................... | 248/62 |
| 5,316,346 | A | * | 5/1994 | Maurer ...................... | 285/23 |

* cited by examiner

*Primary Examiner*—Eric K. Nicholson
*Assistant Examiner*—David E. Bochna
(74) *Attorney, Agent, or Firm*—Guido Modiano; Albert Josif; Daniel O'Byrne

(57) ABSTRACT

An accessory component for piping, such as a valve, filter or the like, comprising a hollow body that can be connected to sections of piping and is provided with elements for coupling the component to a supporting structure, the coupling elements being formed on at least one outer wall of the body.

18 Claims, 4 Drawing Sheets

ACCESSORY COMPONENT FOR PIPING

BACKGROUND OF THE INVENTION

The present invention relates to an accessory component for piping, such as a valve, filter or the like.

Accessory components of the kind of flow control and adjustment elements, such as valves or cocks, or of the kind of purification devices, such as filters, are known which are inserted along the rigid or flexible piping of hydraulic systems such as e.g. irrigation plants and systems for spreading fertilizers and the like.

Each component comprises a hollow body that is connected to two or more piping segments.

In many applications it is necessary to fix and/or support such auxiliary components onto supporting structures (walls, frames of machines or the like); one might consider, for example, the cases in which at least some segments of piping do not rest on a continuous supporting surface (ground or machine frames) but are hung or suspended from supporting structures arranged proximate to them, or the cases in which segments of flexible pipes can move and be maneuvered so that they can be variously orientated and positioned.

In the case of rigid piping, such components are usually fixed and supported by the piping segments to which they are connected.

In the case of flexible piping, the components are fixed to the supporting structures from which the piping segments to which they are connected are hung or suspended; flexible piping in fact cannot bear the weight of such components.

For example, in the case of agricultural irrigation with a mobile apparatus carried by a tractor and with flexible piping, the components (valves, cocks) are fixed to the chassis of the tractor.

Known components commonly do not have devices for fixing to the supporting structures; they are anchored by means of coupling plates and auxiliary screw means that users provide and install on their own and in a makeshift manner.

The users, after providing the coupling plates and screw means, must form holes or coupling points on the body of the component and on the corresponding coupling plate so that they mate, and finally must connect to each other the component to be fixed, the corresponding coupling plate, and the supporting structure.

These operations are long and labor-intensive and often the resulting fixings are uncertain and unreliable, while the unintentional execution on the part of users of incorrect maneuvers or tampering of the component to be fixed can compromise the correct functionality and/or tightness of the component.

Components are also known on the body of which there are bosses in which nuts are inserted, the stems of such screw means and components provided with auxiliary fixing feet being clamped therein.

In these last cases, the considerable space occupation of the supporting structures and of the components to be fixed reduces the space available to perform and check the fixing operations, which accordingly are awkward, labor-intensive and inaccurate.

Moreover, it is noted that if an auxiliary component fixed to a supporting structure needs to be replaced with another one of a different type or size, the fixing of such component generally requires the adoption of another coupling plate and the provision of additional holes or coupling points, since it is highly unlikely that the ones of the previous component can be reused.

These known kinds of accessory components for piping are not devoid of drawbacks, including the fact that they are difficult to anchor to supporting structures, they cause the operations for fixing them performed by users to be disadvantageously long, labor-intensive and highly complicated, they do not allow to provide precise and safe fixings, they do not allow to use existing coupling holes or points, and they entail the risk of losing functionality or tightness due to involuntary tampering on the part of the users during said fixing operations.

Known types of auxiliary component provided with fixing elements (studs or feet) further have disadvantageously high production costs.

SUMMARY OF THE INVENTION

The aim of the present invention is to eliminate the above noted drawbacks of known types of accessory component by providing an accessory component for piping, such as a valve, filter or the like, that has low production costs, can be easily anchored to supporting structures, and allows to simplify, facilitate and speed up the fixing operations performed by users and ensure safe and accurate fixings.

Within this aim, an object of the present invention is to provide an accessory component for piping, such as a valve, filter or the like, which has a functionality and tightness that cannot be altered by the fixing operations performed by users and allows to use coupling points or holes already provided on the supporting structures.

Another object of the present invention is to achieve the above aim and object with a structure that is simple, relatively easy to provide in practice, safe in use, effective in operation, and relatively low in cost.

This aim and these and other objects which will become better apparent hereinafter are all achieved by the present accessory component for piping, such as a valve, filter or the like, of the type that comprises a hollow body that can be connected to sections of piping, characterized in that means for coupling said component to a supporting structure are formed on at least one outer wall of said body.

BRIEF DESCRIPTION OF THE DRAWINGS

Further characteristics and advantages of the present invention will become better apparent from the detailed description of a preferred but not exclusive embodiment of an accessory component for piping, such as a valve, filter or the like, illustrated only by way of non-limitative example in the accompanying drawings, wherein.

DESCRIPTION OF THE PREFERRED EMBODIMENTS

Figure 1:
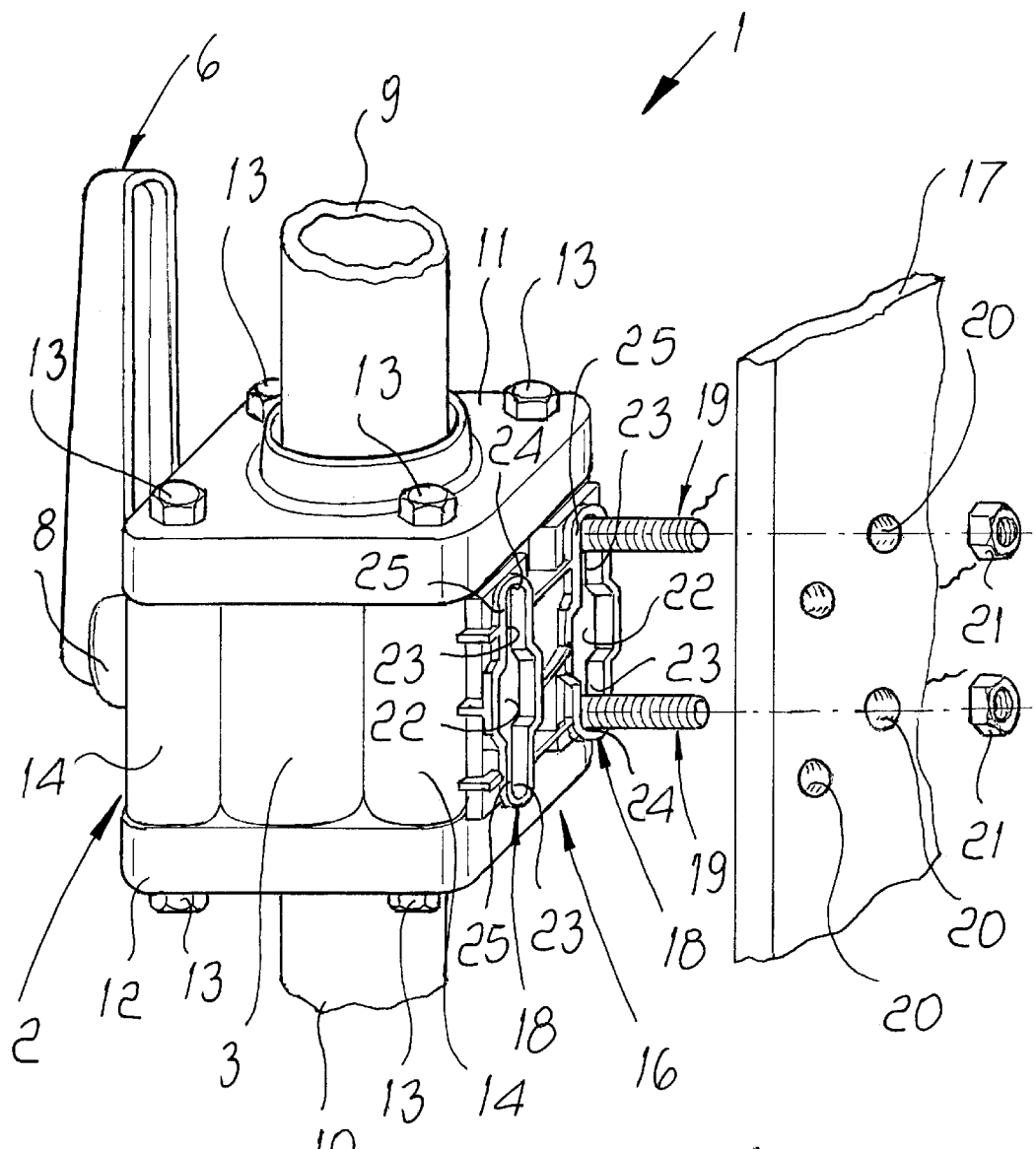
FIG. 1 is a perspective view of an accessory component for piping, such as a ball valve, according to the invention.
Figure 2:
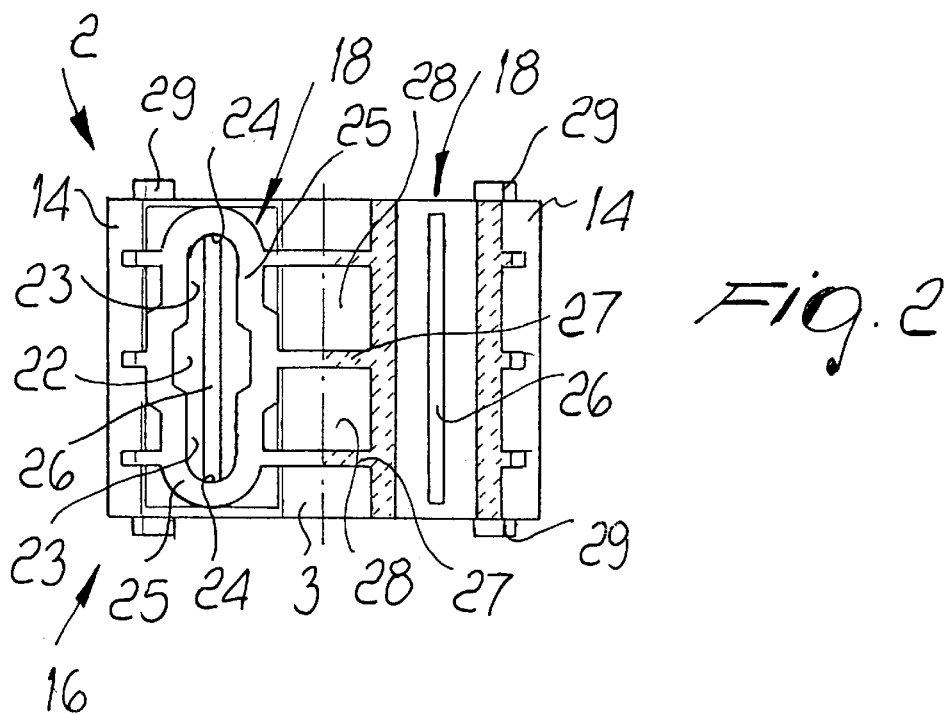
FIG. 2 is a partially sectional bottom view, taken along the line II—II shown in the subsequent FIG. 3, of the body of the component of FIG. 1.
Figure 3:
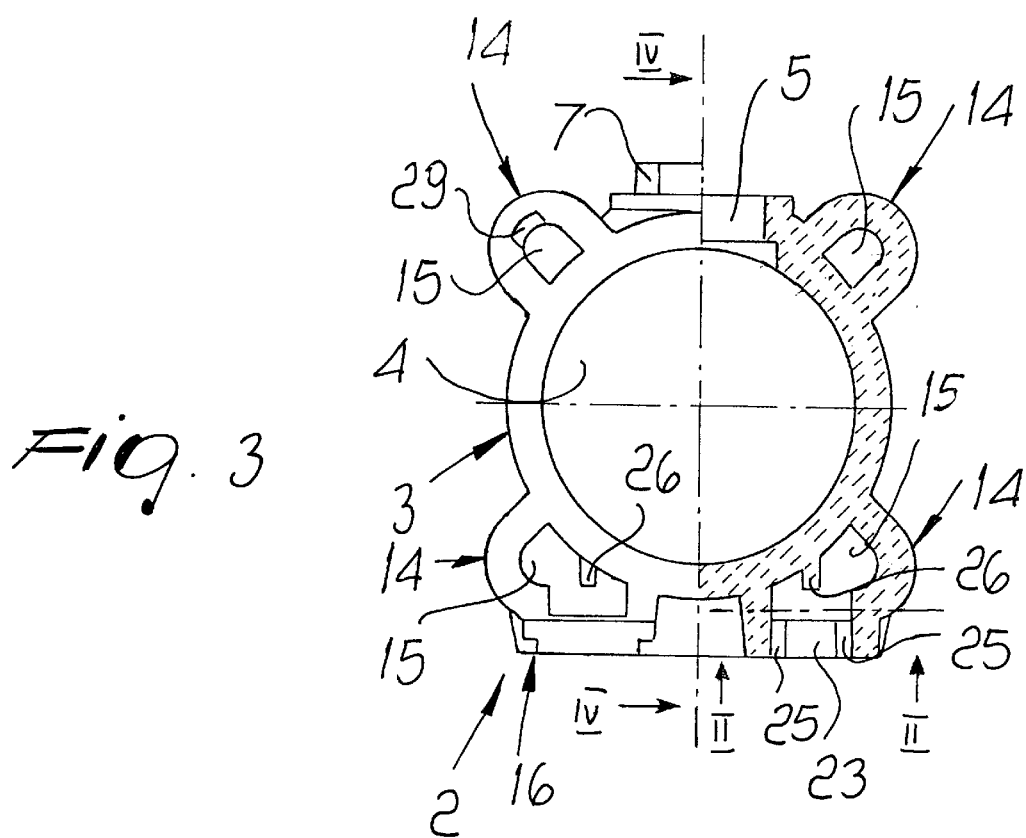
FIG. 3 is a partially sectional front view, taken along the line III—III shown in the subsequent FIG. 4, of the body of the component of FIG. 1.
Figure 4:
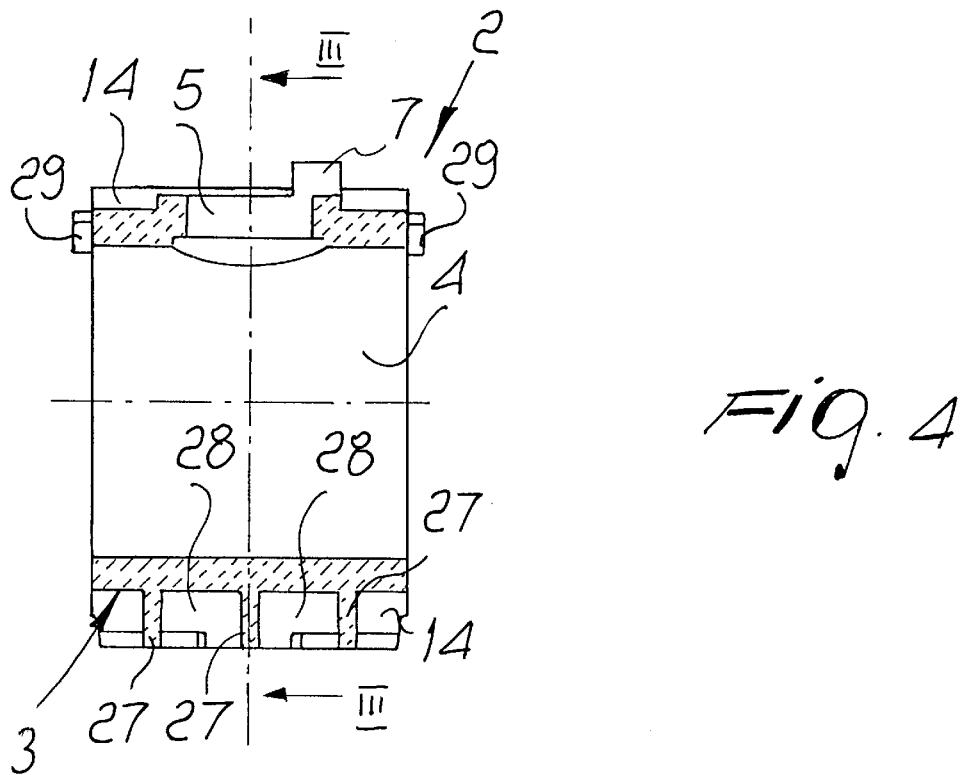
FIG. 4 is a sectional side view, taken along the line IV—IV, of the body of FIG. 3.
Figure 5:
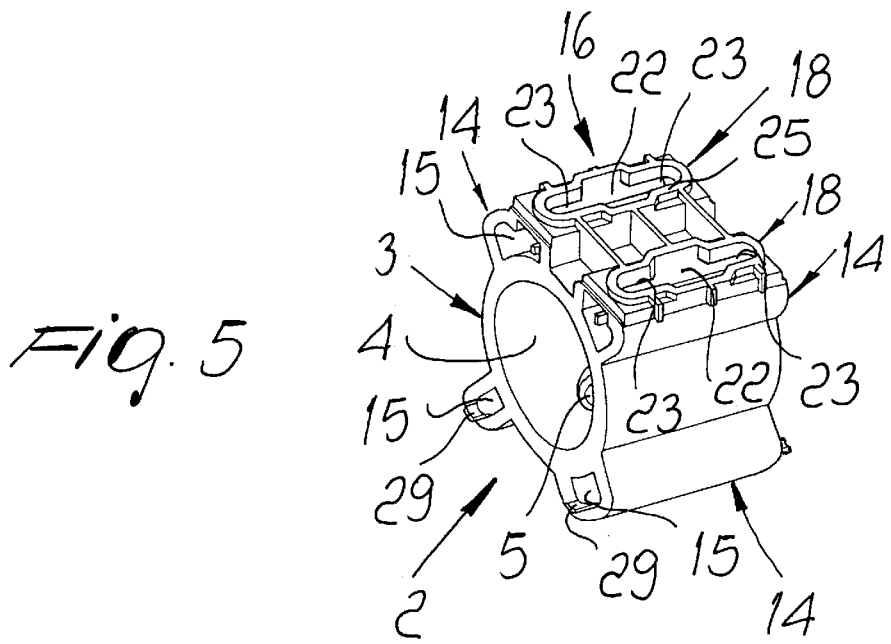
FIG. 5 is a perspective view of the body of the component of FIG. 1, with the coupling means directed upward.

With reference to the figures, the reference numeral 1 generally designates an accessory component for piping, such as a valve, filter or the like.

In FIGS. 1 to 5, the component 1 is constituted by a ball valve; the component 1 can be constituted by a valve of a different type, a filter, a cock, or the like.

The component 1 comprises a hollow body 2, which is constituted by a tubular portion 3 whose cylindrical internal cavity 4 forms the seat of a ball-type flow control element rigidly coupled to an actuation stem; the flow control element and the stem are not shown, since they are of a conventional type.

In the wall of the tubular portion 3 there is a through hole 5 that accommodates the actuation stem so that it rotates about its own longitudinal axis; the stem has an end that extends into the cavity 4 in order to rigidly couple to the flow control element and an opposite end that protrudes out of the hole 5 to couple itself rigidly to an actuation lever 6.

On the upper rim of the hole 5 there are two protruding teeth 7 that are diametrically opposite one another and have an annular sector-like transverse cross-section; the teeth 7 interfere with contrast elements formed inside a collar 8 provided at the base of the lever 6 in order to delimit the maximum angle of rotation of the lever 6 and therefore to determine the two extreme configurations of the flow control element.

The body 2 is inserted between two segments 9 and 10 of pipes that are coaxial to the cavity 4; the two segments 9 and 10 are connected to the two mutually opposite open ends of the body 2 by means of respective connecting sleeves 11 and 12, which are both fixed to the body 2 by means of four locking bolts 13 that pass through the body 2.

On the outer lateral surface of the tubular portion 3 there are provided four centrifugal radial lobes 14 that are arranged diametrically mutually opposite in pairs and lie along the entire length of the tubular portion 3; each lobe 14 is crossed longitudinally by a through hole 15, in which the stem of one of the four locking bolts 13 is inserted in order to fix the two sleeves 11 and 12 to the opposite ends of the body 2.

The body 2 further comprises means 16 for coupling the component 1 to a supporting structure 17 that is constituted for example by the chassis of a tractor or by a wall or the like.

The coupling means 16 are formed on at least one outer lateral wall of the body 2 and are constituted by two elongated slots 18 that are arranged parallel to each other and side by side; the heads of two screws 19 are inserted in each one of the slots 18 so that they can slide along such slot.

The stems of the screws 19 protrude out of the slots 18 in order to be inserted in corresponding through holes 20 formed in the structure 17; after passing through the structure 17, the end of the stems of the screws 19 that protrude from the structure 17, on the opposite side with respect to the component 1, engage corresponding fixing nuts 21.

Each slot 18 comprises a central contoured eye 22 through which the heads of the screws 19 are inserted one at a time; the eye 22 is connected to two slits 23 that act as a guide for the sliding of the screws 19 along the slot 18.

The slits 23 are open upward, both originate from the eye 22, from which they protrude in mutually opposite directions, and end at the mutually opposite ends with respective rounded surfaces 24 for limiting the sliding of the screws 19.

If the screws 19 are of the hexagonal head type, the eye 22 is advantageously shaped so as to form the perimeter of an incomplete hexagon (interrupted at the slits 23) in order to allow the free passage of said heads.

At the upper edge of each slit 23 there is provided a centripetally protruding rim 25 that acts as a means for locking the heads of the screws 19 slidingly inserted in the slit 23; the rim 25 is in fact suitable to prevent, by contrast with the heads of the screws 19, the escape of said screws substantially at right angles to their sliding along the slots 18.

On the bottom of each slot 18 there is also provided a surface for the resting of the heads of the screws 19 inserted therein; said surface is constituted by a longitudinal ridge 26 having a specific thickness.

The ridge 26 and the rim 25 form planes that are substantially parallel and separated one another by a distance that is at least equal to the vertical thickness of the heads of the screws 19: the heads of the screws 19 slide inside the slits 23 in the space formed between the respective ridges 26 and the respective rims 25, while the initial portions of the stems of the screws 19 slide in the guides delimited by the rims 25.

The sliding of the two screws 19, inserted in a slot 18, respectively along the two slits 23 allows to adjust the relative position of said screws 19.

The slots 18 are connected by stiffening ridges 27 separated by lightening regions 28.

Conveniently, the slots 18 are formed at two adjacent lobes 14 and are connected to the respective holes 15; the two remaining lobes 14 have, at their mutually opposite ends, respective centering elements 29 for the sleeves 11 and 12.

Figure 6:
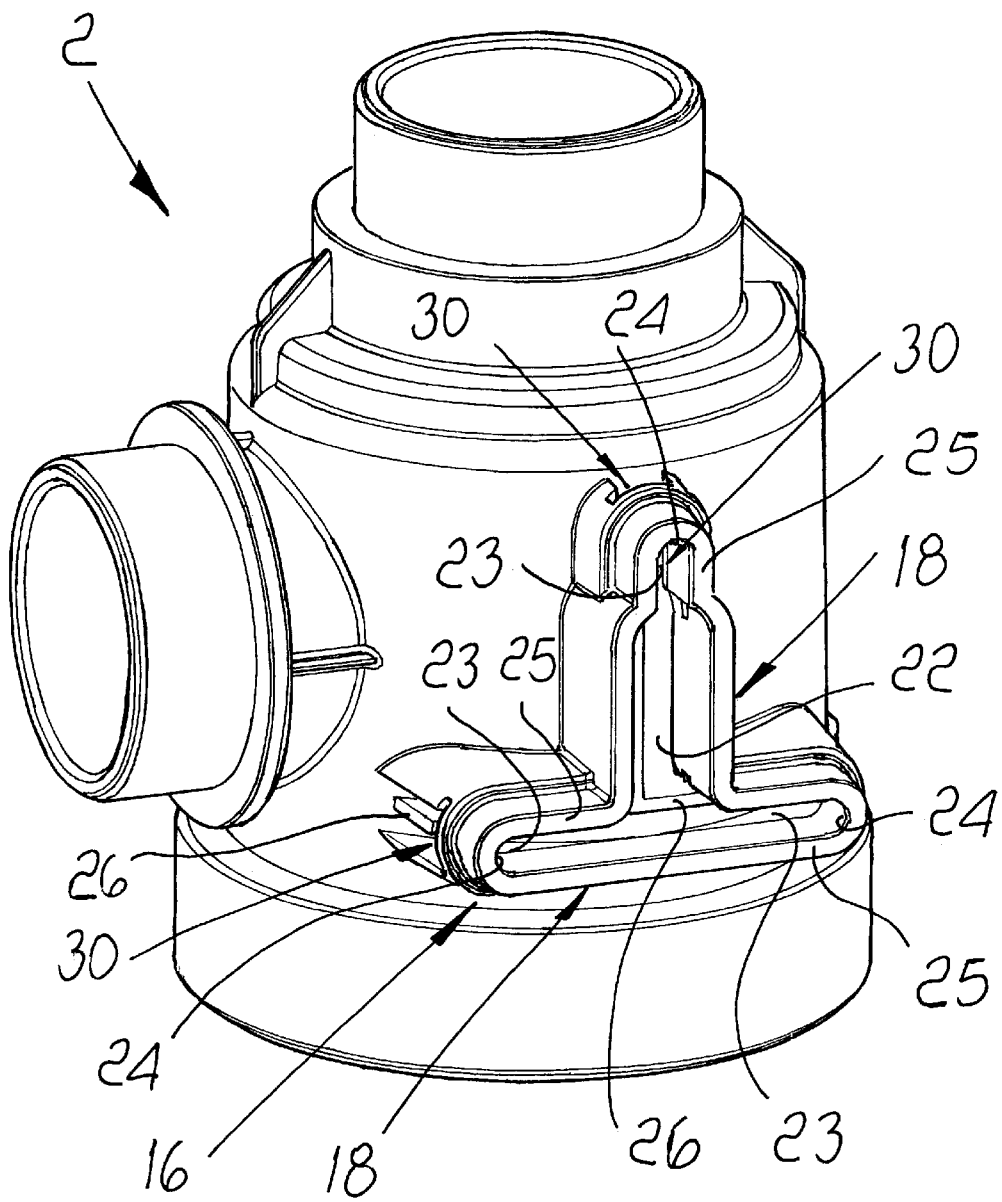
FIG. 6 is a perspective view of the body of an accessory component for piping, such as a filter, according to the invention.

FIG. 6 illustrates the body 2 of a component according to the invention, such as a filter.

On the outer side wall of the body 2 there are provided coupling means 16, constituted by two slots 18 that are arranged at right angles to each other so as to form a T-like shape and are connected one another at the eye 22 that is common to both slots; the slot 18 that corresponds to the stem of the T-like shape is provided with a single end slit 23.

Advantageously, on the inner side walls of the slits 23 there is provided a recess 30 for the insertion of washers, which are fitted on the stems of the screws 19 and are interposed between the inserted heads of the screws 19 and the rims 25 to allow correct distribution of the fixing pressures.

Conveniently, the eye 22 forms an opening whose dimensions allow the insertion of the heads of the screws 19 and of the corresponding washers, while the ridges 26 are mutually connected to as to form a continuous resting surface for the inserted heads of the screws 19.

The operation of the invention is as follows.

In order to fix the component 1 (FIG. 1) to any supporting structure 17, it is sufficient to insert in each slot 18, through the respective eye 22, the heads of two screws 19, one after the other, and to slide the inserted heads of the two screws 19 respectively along the two slits 23 in order to adjust the center distance between the respective stems; the escape of the screws 19 at right angles to their sliding is prevented by the rims 25.

It is then necessary to insert the stems of the screws 19 in the through holes 20 of the structure 17 and lock them with the nuts 21.

In practice it has been found that the described invention achieves the intended aim and objects, i.e. to provide an auxiliary component 1 for piping that can be easily anchored to supporting structures 17 and allows to simplify, facilitate and speed up fixing operations performed by users.

The component 1 is in fact provided with coupling means 16 formed monolithically with its body 2, so that users only have to insert the screw means 19 but do not have to provide auxiliary coupling plates or provide holes or coupling points on the body 2.

Moreover, it is observed that the component 1 has a functionality and tightness that cannot be altered by the fixing operations performed by users, since it does not need to be subjected to any adaptation.

Finally, the component 1 allows to use coupling points or holes that are already present on the supporting structures 17 and acts as a supporting element for both flexible and rigid piping.

The invention thus conceived is susceptible of numerous modifications and variations, all of which are within the scope of the appended claims.

All the details may further be replaced with other technically equivalent ones.

In practice, the materials used, as well as the shapes and the dimensions, may be any according to requirements without thereby abandoning the scope of the protection of the appended claims.

The disclosures in Italian Patent Application No. MO2000A000237 from which this application claims priority are incorporated herein by reference.

What is claimed is:

1. An accessory component for piping, of the type that has a hollow body, and which is connectable to sections of piping and to a supporting structure, the component having coupling means formed on at least one outer wall of said body for coupling the component to the supporting structure, said coupling means comprising:

at least one elongated slot comprising a central contoured eye and two slits connected to, and extending from said eye on opposite sides thereof;

at least two screw means provided each with a respective fixing stem having a first end, constituted by a head adapted to be inserted in said eye so that said at least two screw means are slideable in a sliding direction extending along said slits for adjustment of a canter distance between the fixing stems thereof, and a second opposite end adapted to be fixed to the supporting structure.

2. The component of claim 1, wherein said at least one elongated slot is provided with locking means for locking the head of each of said screw means so as to prevent escape thereof along a direction extending substantially at right angles to said sliding direction.

3. The component of claim 2, wherein said locking means are constituted by a rim formed so as to protrude centripetally at an upper edge of said slits, said rim delimiting a sliding guide for sliding of said fixing stems.

4. The component of claim 3, wherein said at least one elongated slot comprises a resting surface, provided at a bottom region thereof, on which the head of each of said screw means rests.

5. The component of claim 4, wherein said resting surface and said rim are arranged on planes that are substantially parallel one another so that a distance between said resting surface and said rim is at least equal to a vertical thickness of the head of each said screw means.

6. The component of claim 3, wherein said slot comprises a recess formed in an internal side wall thereof for insertion of at least one washer fitted on the fixing stem of each one of said screw means and interposed between the inserted head and the rim.

7. The component of claim 1, wherein said at least one slot has opposite ends which are rounded and provide surfaces for limiting sliding of said screw means.

8. The component of claim 1, comprising two elongated slots, arranged side by side, substantially parallel to each other.

9. The component of claim 1, comprising two elongated slots, arranged substantially at right angles to each other.

10. An accessory component for piping, of the type that has a hollow body, which is connectable to sections of piping and to a supporting structure, the component having coupling means formed on at least one outer wall of said body for coupling the component to the supporting structure, said coupling means comprising:

at least one elongated slot;

at least one screw means provided with a respective fixing stem having a first end constituted by a head adapted to be inserted in said slot so that said at least one screw means is slideable in a sliding direction extending along said slot and a second, opposite end adapted to be tired to the supporting structure;

locking means formed by a rim adapted for locking the head of said at least one screw means so as to prevent escape thereof along a direction extending substantially at right angles to said sliding direction; and a recess, provided in an internal wall of said at least one slot, for insertion of at least one washer fitted on the fixing stem of said at least one screw means and interposed between the inserted head thereof and said rim.

11. The component of claim 10, wherein said at least one slot comprises a contoured eye for insertion of said head and at least one slit originating from said eye for guiding sliding of said screw wisp said eye being connected to said at least one slit.

12. The component of claim 11, wherein said rim is provided so as to protrude centripetally at an upper edge of said at least one slit, said rim delimiting a guide for sliding of said fixing stem.

13. The component of claim 11, wherein said at least one elongated slot comprises a resting surface, provided at a bottom region thereof, on which the head of said screw means rests.

14. The component of claim 13, wherein said resting surface and said rim are arranged on planes that are substantially parallel one another so that a distance between said resting surface and said rim is at least equal to a vertical thickness of the head of said screw means.

15. The component of claim 11, wherein said coupling means comprises two screw means, said eye being formed substantially at a center of said slot with two said slits protruding on opposite sides starting from said eye, the heads of said screw means being successively insertable in said eye, said screw means being respectively able to slide in said two slots so as to provide adjustment of a center distance between the respective fixing stems.

16. The component of claim 15, wherein said slot has opposite ends which are rounded and form surfaces for limiting sliding of said screw means.

17. The component of claim 11, comprising two elongated slots which are arranged side by side substantially parallel to each other.

18. The component of claim 11, comprising two elongated slots arranged substantially at right angles to each other.

* * * * *